United States Patent
Ito (10) Patent No.: US 11,245,830 B2
(45) Date of Patent: Feb. 8, 2022

(54) IMAGE CAPTURE APPARATUS AND CONTROL METHOD FOR SAME, AND STORAGE MEDIUM

(71) Applicant: CANON KABUSHIKI KAISHA, Tokyo (JP)

(72) Inventor: Katsuhiro Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/170,027

(22) Filed: Feb. 8, 2021

(65) Prior Publication Data

US 2021/0266450 A1 Aug. 26, 2021

(30) Foreign Application Priority Data

Feb. 26, 2020 (JP) .............................. JP2020-030850

(51) Int. Cl.
*H04N 5/232* (2006.01)
*G06F 3/16* (2006.01)

(52) U.S. Cl.
CPC ......... *H04N 5/23203* (2013.01); *G06F 3/167* (2013.01); *H04N 5/23216* (2013.01); *H04N 5/23219* (2013.01); *H04N 5/23299* (2018.08)

(58) Field of Classification Search
CPC ........... H04N 5/23203; H04N 5/23299; H04N 5/23219; H04N 5/23216; H04N 5/23296; G06F 3/167
See application file for complete search history.

(56) References Cited

U.S. PATENT DOCUMENTS

| 2009/0185056 A1* | 7/2009 | Okamoto | G06K 9/00228 |
| | | | 348/240.99 |
| 2011/0205379 A1* | 8/2011 | Konicek | H04N 5/23219 |
| | | | 348/211.1 |
| 2020/0322540 A1 | 10/2020 | Tsujimoto | |

FOREIGN PATENT DOCUMENTS

| JP | 2013168745 A | * | 8/2013 |
| JP | 2019117374 A | | 7/2019 |

OTHER PUBLICATIONS

Machine English Translation, JP 2013-168745 A, Iwasaki, Aug. 29, 2013 (Year: 2013).*

* cited by examiner

*Primary Examiner* — Nelson D. Hernández Hernández
(74) *Attorney, Agent, or Firm* — Rossi, Kimms & McDowell LLP (57) ABSTRACT

An image capture apparatus includes an image capture device, a driving device configured to drive to change an orientation of the image capture device; an input device configured to receive input of voice, and a controller configured to, if the input voice is an instruction to shoot an image, perform control of stopping the driving device and causing the image capture device to capture an image at a stopping position, and also of moving the orientation of the image capture device from the stopping position by a predetermined amount in positive and negative directions in the drive direction and causing the image capture device to capture images at the position after being moved in the positive direction and the position after being moved in the negative direction.

11 Claims, 6 Drawing Sheets

| | | PAN ANGLE CHANGING VELOCITY (deg/s) | | |
|---|---|---|---|---|
| | | TO 10 | TO 30 | TO 50 |
| ZOOM MAGNIFICATION (TIMES) | 1 | 5° | 10° | 15° |
| | 2 | 10° | 15° | 20° |
| | 3 | 15° | 20° | 30° |

IMAGE CAPTURE APPARATUS AND CONTROL METHOD FOR SAME, AND STORAGE MEDIUM

BACKGROUND OF THE INVENTION

Field of the Invention

The present invention relates to a technique for controlling image shooting using a voice command in an image capture apparatus.

Description of the Related Art

In recent years, automatic photography cameras that periodically and continuously shoot images without a user providing image shooting instructions have been developed and put into practical use. For example, so-called "lifelog cameras" are known, which are used in a state of being attached to a user's body by a strap or the like and record scenes that the user sees in everyday life as images at a predetermined time interval.

In addition, there are also automatic photography cameras in which the shutter is released when smiles, people's faces, dogs, cats, sudden movements, and the like are recognized, and cameras that have a pan-tilt-zoom (PTZ) control mechanism and that perform automatic image shooting while freely changing the image shooting range.

While automatic photography cameras usually shoot images automatically, there are also cases in which users would like to intentionally shoot images such as selfies, group photographs, and photographs of buildings and monuments, for example. Therefore, among such automatic cameras, there are also cameras which support voice commands and to which instructions to shoot moving images and still images can be provided via voice.

As a technique for realizing the function of providing instructions to shoot images via voice commands as described above, Japanese Patent Laid-Open No. 2019-117374 discloses a technique for detecting the direction of the sound source of voice using a plurality of sound collecting units and a detection unit, and shooting an image while controlling a driving unit so that an image capture direction of an image capture unit is directed toward the detected direction of the sound source.

In the conventional technique disclosed in Japanese Patent Laid-Open No. 2019-117374, image shooting can be executed if input voice is analyzed and is recognized as being an image shooting instruction. In addition, image shooting can also be executed while specifying the direction of the sound source and changing the direction.

However, since automatic photography cameras automatically shoot images while performing PTZ control, especially the changing of the pan angle, at all times, it is not easy to shoot an image with a photographic subject of interest fitted into the frame when an image shooting instruction is provided via voice. In addition, even if the direction of the sound source can be specified, image shooting cannot be performed as intended if the person providing a voice instruction would like to shoot an image of a different person, a building, or the like.

SUMMARY OF THE INVENTION

The present invention has been made in view of the above-described problems and enables an image to be shot with a photographic subject of interest fitted into the frame when an instruction to shoot an image is provided via a voice command in an image capture apparatus including a means for automatically moving the image shooting direction.

According to a first aspect of the present invention, there is provided an image capture apparatus comprising: an image capture device configured to capture images; a driving device configured to drive to change an orientation of the image capture device; an input device configured to receive input of voice; and a controller configured to, if the input voice is an instruction to shoot an image, perform control of stopping the driving device and causing the image capture device to capture an image at a stopping position where the orientation of the image capture device stops changing, and also of moving the orientation of the image capture device from the stopping position by a predetermined amount in positive and negative directions in the drive direction of the driving device and causing the image capture device to capture images at the position after being moved in the positive direction and the position after being moved in the negative direction.

According to a second aspect of the present invention, there is provided a method for controlling an image capture apparatus that comprises an image capture device configured to capture images, the method comprising: driving to change an orientation of the image capture device; receiving input of voice; and if the input voice is an instruction to shoot an image, performing control of stopping the driving and causing the image capture device to capture an image at a stopping position where the orientation of the image capture device stops changing, and also of moving the orientation of the image capture device from the stopping position by a predetermined amount in positive and negative directions in a drive direction in the driving and causing the image capture device to capture images at the position after being moved in the positive direction and the position after being moved in the negative direction.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that a case in which control according to the present invention is implemented using a smartphone will be described in the following embodiments. However, the present invention is applicable to any electronic device that can communicate with an image capture apparatus. Such electronic devices include computer devices (personal computers, tablet computers, media players, PDAs, etc.), portable telephones, game devices, etc. These devices are examples, and the present invention is also applicable to other electronic devices.

First Embodiment

Figure 1A:
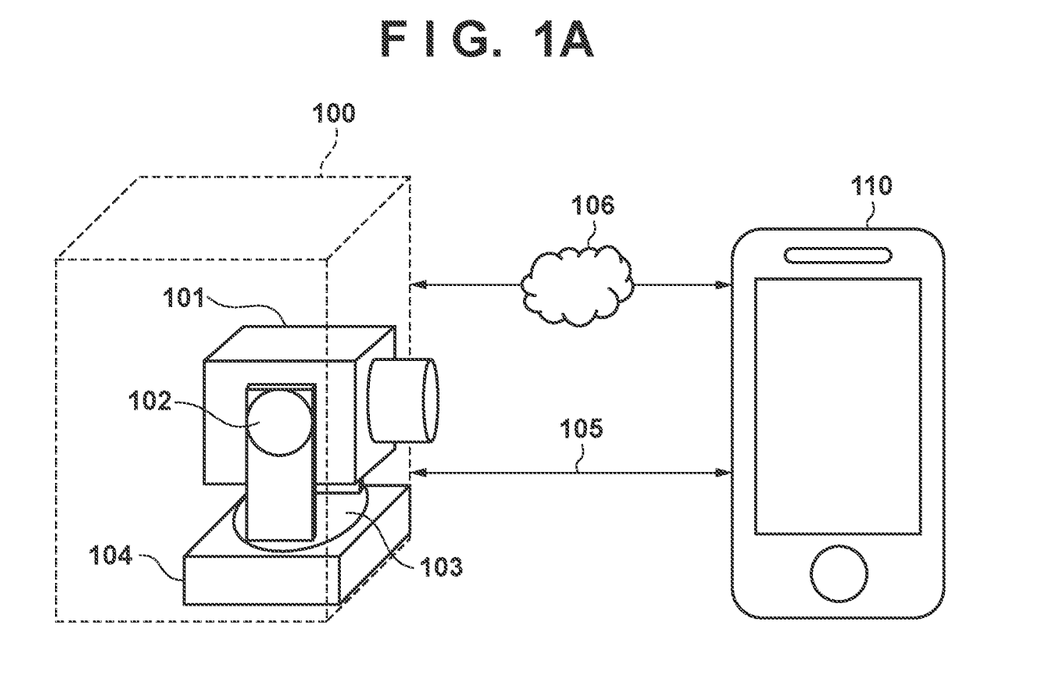
FIGS. 1A and 1B are diagrams schematically illustrating a configuration of a remote capturing system pertaining to a first embodiment of the present invention.
Figure 1B:
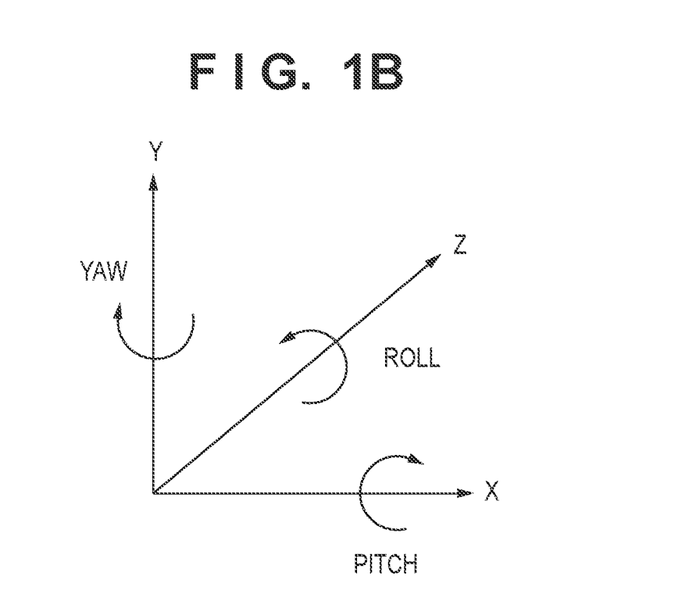

FIGS. 1A and 1B are diagrams schematically illustrating a configuration of a remote capturing system pertaining to a first embodiment of the present invention. As illustrated in FIG. 1A, the remote capturing system is configured by connecting an image capture apparatus 100 and a smartphone 110, which is an external device for remotely controlling the image capture apparatus 100, so as to be capable of communicating with one another.

The image capture apparatus 100 includes a lens barrel 101, a tilt unit 102, a pan unit 103, and a control box 104.

The lens barrel 101 includes an image sensor and an image shooting lens group serving as an image capture optical system. The lens barrel 101 shoots images based on control by the control box 104, and outputs image data that is obtained to the control box 104. The image shooting lens group includes movable lenses such as a focus lens and a variable magnification lens, and driving circuits therefor. The movable lenses are driven by the control box 104.

The lens barrel 101 is rotatively driven by the tilt unit 102. In accordance with an instruction from the control box 104, the tilt unit 102 drives the lens barrel 101 to rotate about a horizontal axis that is perpendicular to the optical axis of the image capture optical system. The elevation or depression angle of the lens barrel 101 (optical axis) is changed by the tilt unit 102.

The tilt unit 102 is attached to the pan unit 103. In accordance with an instruction from the control box 104, the pan unit 103 drives the tilt unit 102 to rotate about a vertical axis that is perpendicular to the optical axis of the image capture optical system. The azimuth angle of the lens barrel 101 (optical axis) attached to the tilt unit 102 changes by the pan unit 103 making the tilt unit 102 rotate.

FIG. 1B illustrates an orthogonal coordinate system in which the optical axis of the image capture optical system is illustrated as the Z axis, and the point at which the image sensor and the optical axis intersect is illustrated as the origin. The tilt unit 102 has a rotation axis about the X axis (pitch direction), and the pan unit 103 has a rotation axis about the Y axis (yaw direction).

In accordance with an instruction from an operation member included in the image capture apparatus 100 or the smartphone 110, the control box 104 controls the drive of the movable lenses included in the lens barrel 101, the image shooting operation by the lens barrel 101, and the operations of the tilt unit 102 and the pan unit 103. The control box 104 transmits data of the captured images and information regarding the image capture apparatus 100 to the smartphone 110.

Furthermore, the control box 104 recognizes that sound in the surroundings thereof is a command by collecting the sound via a microphone (undepicted) mounted thereon and analyzing the sound, and controls the image capture apparatus 100 based on the content of the command.

The smartphone 110 is one example of an electronic device that can execute a remote control application for the image capture apparatus 100, for example. The smartphone 110 and the image capture apparatus 100 can communicate with one another by means of direct wireless or wired communication 105, or communication 106 over a computer network, a telephone network, etc. Note that the image capture apparatus 100 and the smartphone 110 can communicate using any communication protocol supported by both the image capture apparatus 100 and the smartphone 110.

Figure 2:
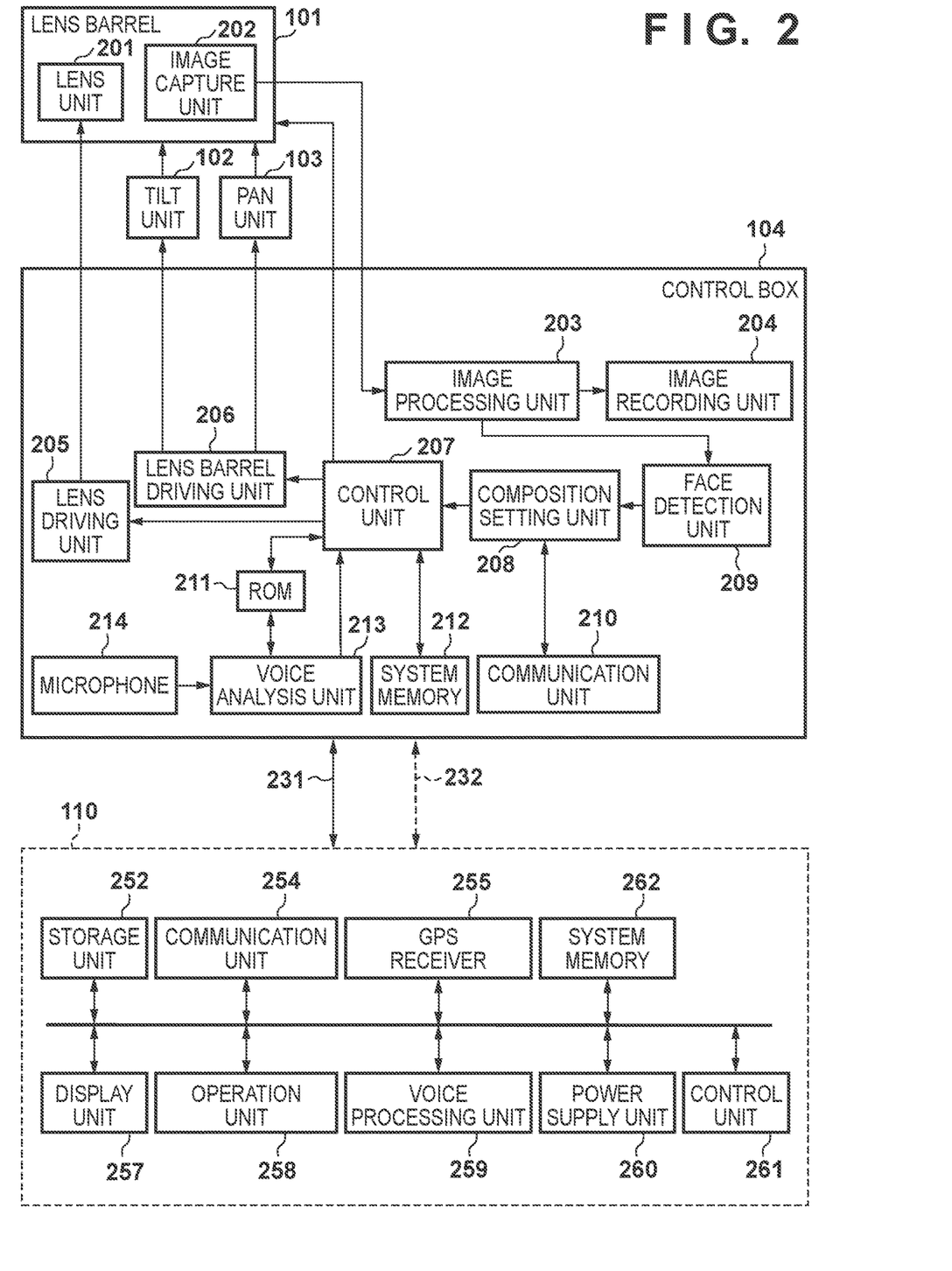
FIG. 2 is a block diagram illustrating an example of a functional configuration of the remote capturing system pertaining to the first embodiment.

FIG. 2 is a block diagram illustrating an example of a functional configuration of the remote capturing system, and the same reference numerals are appended to configurations that are the same as those in FIGS. 1A and 1B.

The lens barrel 101 includes a lens unit 201 (image capture optical system) and an image capture unit 202, and the optical axis direction can be adjusted by means of the tilt unit 102 and the pan unit 103.

The movable lenses included in the lens unit 201, such as the variable magnification lens and the focus lens, are driven by a lens driving unit 205 of the control box 104. The lens unit 201 forms an optical image on an image capture surface of the image sensor, which is included in the image capture unit 202.

The image capture unit 202 includes the image sensor, which is a CMOS image sensor, for example, and converts the optical image formed by the lens unit 201 into an analog signal group (analog image signal) by means of a plurality of photoelectric conversion elements. Furthermore, the image capture unit 202 applies AD conversion, noise reduction processing, etc., to the analog image signal, and outputs the result to the control box 104 as image data.

The tilt unit 102 includes a driving mechanism for making the lens barrel 101 rotate in the pitch direction in FIG. 1B. Also, the pan unit 103 includes a driving mechanism for making the tilt unit 102 rotate in the yaw direction in FIG. 1B. The lens barrel 101 is driven to rotate based on driving instructions input from a lens barrel driving unit 206.

The control box 104 includes an image processing unit 203, an image recording unit 204, the lens driving unit 205, the lens barrel driving unit 206, a control unit 207, a composition setting unit 208, a face detection unit 209, a communication unit 210, a ROM 211, a system memory 212, a voice analysis unit 213, and the microphone (sound collecting unit) 214.

The image processing unit 203 applies image processing such as distortion correction processing, white balance adjustment processing, color interpolation processing, and encoding processing to image data output from the image capture unit 202 of the lens barrel 101, and generates image data for recording and image data for display. The image data for display may be obtained by reducing the resolution of the image data for recording. Also, the image processing unit 203 may generate only the image data for recording.

The image data for recording is output to the image recording unit 204. The image recording unit 204 stores digital image data output from the image processing unit 203 in a data file having a format in accordance with a specification such as JPEG or MPEG, and records the data file to a recording medium such as a non-volatile memory. Image data generated by the image processing unit 203 is also output to the face detection unit 209 and the communication unit 210.

The face detection unit 209 applies publicly-known face detection processing to the image data input from the image processing unit 203, and detects one or more regions (face regions) that appear to be people's faces. The face detection unit 209 outputs the detection result (the number of the face regions and position information of the face regions) to the composition setting unit 208. Note that face regions are one example of a photographic subject region to which the image capture apparatus 100 applies a tracking function and an automatic composition setting function. Accordingly, the face detection unit 209 is one example of a configuration for detecting a predetermined region of a photographic subject.

The communication unit 210 is a communication interface for realizing communication between the smartphone 110 or another external device, and the image capture apparatus 100. The communication unit 210 has a configuration supporting one or more of wired communication and wireless communication. Communication standards supported by the communication unit 210 include USB, Ethernet (registered trademark), HDMI (registered trademark), wireless LAN (IEEE802.11 series), Bluetooth (registered trademark), 3GPP 3G, 4G, 5G, etc., for example, but are not limited to these standards.

The lens driving unit 205 drives the zoom lens and the focus lens included in the lens unit 201 based on instructions (for example, target positions and driving speeds) input from the control unit 207.

The lens barrel driving unit 206 drives the tilt unit 102 and the pan unit 103 based on instructions (for example, rotation directions and rotation amounts) input from the control unit 207.

The control unit 207 is a microprocessor such as a CPU, for example, and controls the operations of the components of the image capture apparatus 100 and realizes the functions of the image capture apparatus 100 by loading programs stored in the ROM 211 to the system memory 212 and executing the programs.

The ROM 211 is a rewritable non-volatile memory, and stores programs executed by the control unit 207, registered voice commands, and various setting values of the image capture apparatus 100. The system memory 212 is a memory that the control unit 207 uses when executing programs.

Based on magnification information and position information input from the composition setting unit 208 and command information input from the voice analysis unit 213, the control unit 207 generates instructions or commands (for example, target positions and driving speeds) for controlling the lens driving unit 205 and the lens barrel driving unit 206. Furthermore, the control unit 207 outputs the generated instructions to the lens driving unit 205 and the lens barrel driving unit 206.

The composition setting unit 208 sets a composition based on the position information, which is inputted from the face detection unit 209, of one or more face regions detected in a captured image. The composition setting unit 208 can set the magnification so that the face regions become greater than or equal to a predetermined size, for example. Also, the composition setting unit 208 can set the image shooting direction so that a face region is positioned at the center of an image, for example. Furthermore, the composition setting unit 208 calculates the magnification and target positions (pan and tilt angles) for realizing the magnification and image shooting direction that have been set, and outputs the results to the control unit 207. Note that the composition setting method described here is a mere example, and other methods may be used.

In addition, if a command that is an instruction for a panning, tilting, or zooming operation is received from the smartphone 110 via the communication unit 210, the composition setting unit 208 sets a target position or magnification that is based on the command and outputs the result to the control unit 207 and the communication unit 210. Note that, while the composition setting unit 208 is illustrated as an independent block, the composition setting unit 208 may also be realized by the control unit 207.

The voice analysis unit 213 determines whether or not voice data collected by the microphone 214 is a voice command, and whether or not the voice data matches a registered voice command stored in the ROM 211. Furthermore, if the voice analysis unit 213 detects voice data matching a registered voice command stored in the ROM 211, the voice analysis unit 213 outputs, to the control unit 207, command information indicating what instruction is specified by the command. Note that description regarding voice recognition is omitted herein since voice recognition itself is a well-known technique.

If the image capture apparatus 100 is on, the microphone 214 collects voice that is input thereto, and outputs the input voice to the voice analysis unit 213 as voice data.

Next, a configuration of the smartphone 110 will be described. A communication unit 254 is a communication interface for realizing communication between the image capture apparatus 100 or another device, and the smartphone 110. The communication unit 254 may have a configuration that is basically the same as that of the communication unit 210 included in the image capture apparatus 100. However, since the smartphone 110 has a call function, the communication unit 254 includes a function for communicating with a telephone communication network.

A control unit 261 is a microprocessor such as a CPU, for example, and controls the operations of the components of the smartphone 110 and realizes the functions of the smartphone 110 by loading programs stored in a storage unit 252 to a system memory 262 and executing the programs.

The storage unit 252 is a rewritable non-volatile memory, and stores the programs executed by the control unit 261, various setting values of the smartphone 110, GUI data, etc. A remote capturing application, which will be described later, is also stored in the storage unit 252. The system memory 262 is a memory that the control unit 261 uses when executing programs. A part of the system memory 262 is also used as a video memory of a display unit 257.

A power supply unit 260 supplies power to the constituent elements in the smartphone 110. The display unit 257 is a touch display, for example. The display unit 257 may have other functions, such as fingerprint sensor and speaker functions. User interfaces (UIs) provided by applications and the OS of the smartphone 110, captured images, etc., are displayed on the display unit 257.

An operation unit 258 collectively refers to input devices used by a user to provide instructions to the smartphone 110, for example. The operation unit 258 includes a volume adjustment button, a power button, etc. Note that the touch panel provided in the display unit 257 is also included in the operation unit 258.

A voice processing unit 259 processes voice signals acquired from a microphone built into the smartphone 110, for example. The voice processing unit 259 may have a voice recognition function. In this case, the user can use the user's voice to input commands and texts. Note that the voice recognition function may be realized using a function of an external apparatus that the smartphone 110 can communicate with via the communication unit 254.

A Global Positioning System (GPS) receiver 255 acquires position information (longitude and latitude information) of the smartphone 110 by performing positioning processing based on signals received from GPS satellites. Note that the position information of the smartphone 110 may be acquired using other methods, such as the Wi-Fi positioning system (WPS).

The control unit 261 can use, as event information for controlling the image capture apparatus 100, information as to whether the current position information of the smartphone 110 is included in a preset geographical range or information as to whether a predetermined change in current position has been detected. For example, the control unit 261 can use the event information as a trigger for starting and stopping image shooting by the image capture apparatus 100.

The image capture apparatus 100 and the smartphone 110 perform bidirectional communication via the communication unit 210 and the communication unit 254. For example, the image capture apparatus 100 transmits audio and image signals obtained by the image capture unit 202, information regarding the image capture apparatus 100, etc., to the smartphone 110, and receives various commands from the smartphone 110. For example, the smartphone 110 transmits commands for panning, tilting, zooming, starting and stopping image shooting, etc., to the image capture apparatus 100, and receives the execution results of the commands.

The communication unit 210 and the communication unit 254 can communicate by simultaneously or selectively using a plurality of communication channels based on different communication standards. For example, the communication unit 210 and the communication unit 254 can communicate using a first communication channel 231 that is based on a first standard (for example, a wireless LAN standard) and a second communication channel 232 that is based on a second standard (for example, the BLE standard). For example, power consumption can be reduced and efficient communication can be realized by performing communication based on a plurality of standards having suitable power consumption, communicable distance, and communication speed in accordance with the purpose of communication.

For example, once the image capture apparatus 100 is activated, the control unit 207 of the image capture apparatus 100 monitors whether a communication request is received via the communication unit 210. In this state, a moving picture may be shot or still images may be periodically shot, and the obtained image data may be recorded to the image recording unit 204.

If the remote capturing application is executed on the smartphone 110, the control unit 261 transmits a communication request to the image capture apparatus 100. Note that information necessary for the communication with the image capture apparatus 100 is set beforehand in the storage unit 252.

If the control unit 207 receives the communication request from the smartphone 110, the control unit 207 exchanges information with the control unit 261 according to the procedure prescribed in the communication standard, and establishes communication. If the communication with the smartphone 110 is established, the control unit 207 transmits information regarding the image capture apparatus 100 to the smartphone 110. The information regarding the image capture apparatus 100 may include information regarding the model of the apparatus and the size of the image sensor, and information regarding the image capture optical system. Also, the information regarding the image capture optical system may include a focal distance corresponding to the 1× zoom magnification, lens information (zoom magnification of image capture optical system, tilt unit rotation angle, and pan unit rotation angle), and adjustable ranges of the image capture optical system (for example, minimum and maximum values of magnification and rotation angles).

In addition, the control unit 207 starts to transmit a captured image to the smartphone 110. The captured image transmitted to the smartphone 110 may be image data for display generated by the image processing unit 203. If the image processing unit 203 does not generate image data for display, the control unit 207 may generate image data for display from image data for recording. Note that, while the image capture apparatus 100 captures a moving image having a predetermined frame rate here, the image capture apparatus 100 may capture still images in response to instructions from the smartphone 110.

If the control unit 261 receives the information regarding the image capture apparatus 100 from the image capture apparatus 100, with which communication has been established, the control unit 261 stores the information to the system memory 262. In addition, once the control unit 261 starts receiving the captured image from the image capture apparatus 100, the control unit 261 displays, on the display unit 257, a GUI screen generated by the remote capturing application.

FIGS. 3A to 3D are diagrams illustrating an example of control performed when the image capture apparatus 100 detects a voice command that is an instruction to "shoot an image".

Figure 3A:
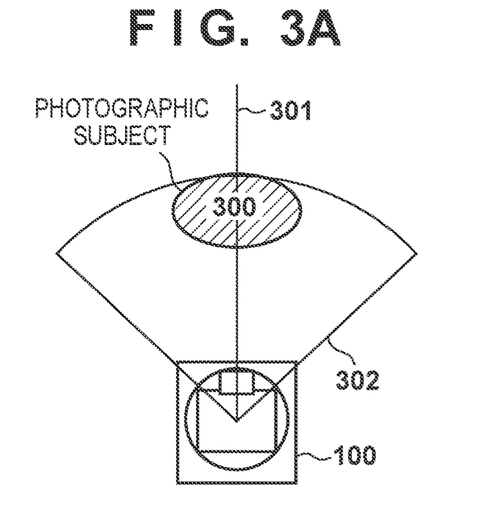
FIGS. 3A to 3D are diagrams for describing an example of control performed when an image shooting instruction command is detected.

FIG. 3A illustrates a situation in which the image capture apparatus 100 is capturing, at the center of the angle of view thereof, a photographic subject 300 that the user would like to shoot an image of via the voice command instruction. Here, a circle sector 302 indicates the angle-of-view range of the image capture apparatus 100, and a solid line 301 indicates the angle-of-view center.

Here, the image capture apparatus 100 automatically controls and changes the pan angle in order to search for a photographic subject of which an image is to be shot. In the present embodiment, a configuration is adopted such that the pan angle can be controlled and changed at a maximum angular velocity of 50 degree/sec (hereinafter "deg/s"). Furthermore, the user can provide an image shooting instruction via a voice command. If the image capture apparatus 100 detects an image shooting instruction, the image capture apparatus 100 stops the pan angle changing operation and performs image shooting. In a case in which the user provides an image shooting instruction via a voice command while the image capture apparatus 100 is changing the pan angle, the image capture apparatus 100 may stop at a position differing from that intended by the user and perform image shooting, depending on the timing when the user speaks and the timing when the voice command is detected by the image capture apparatus 100.

Figure 3B:
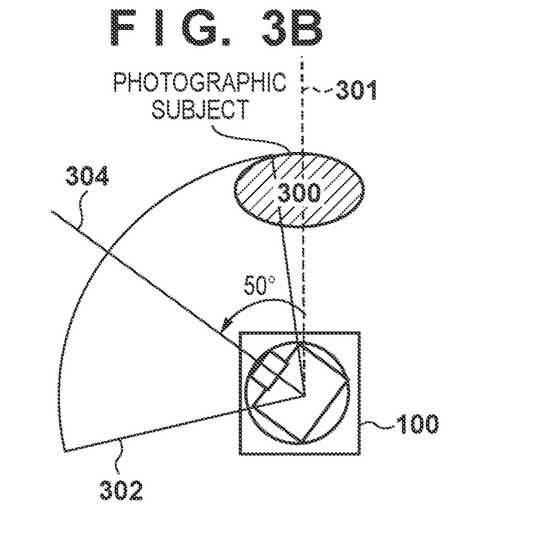

FIG. 3B illustrates a state in which the image capture apparatus 100 has stopped in a case in which the detection of image shooting instruction voice produced by the user with the intention of stopping the image capture apparatus 100 at a position where the center of the photographic subject 300 matches the position of the angle-of-view center 301 of the image capture apparatus 100 was delayed by one second when the image capture apparatus 100 was controlling and changing the pan angle at an angular velocity of 50 deg/s in the counterclockwise direction at the position in FIG. 3A.

An angle-of-view center 304 of the image capture apparatus 100 in this state is located at a position that is forward by 50° in the counterclockwise direction from the angle-of-view center 301 at the position in FIG. 3A, which is the position where the user wanted to shoot an image. This indicates that, consequently, an image in which the photographic subject 300 is fitted into the angle of view cannot be shot if image shooting is performed at this position.

Figure 3C:
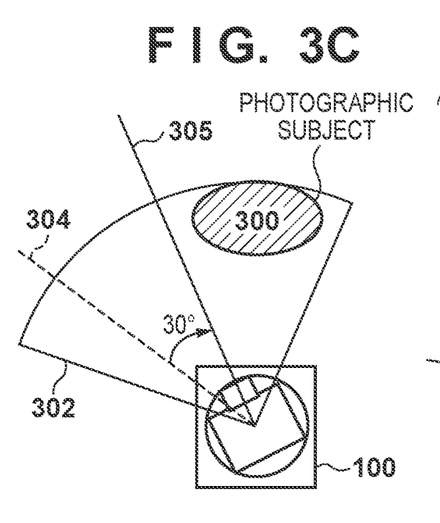

FIG. 3C illustrates a state in which the image capture apparatus 100 has stopped after changing the pan angle by 30° in the clockwise direction from the state in FIG. 3B. An angle-of-view center 305 of the image capture apparatus 100 in this state is located at a position that is 30° in the clockwise direction from the angle-of-view center 304 at the position in FIG. 3B, and the circle sector 302 indicating the angle-of-view range contains the photographic subject 300.

Figure 3D:
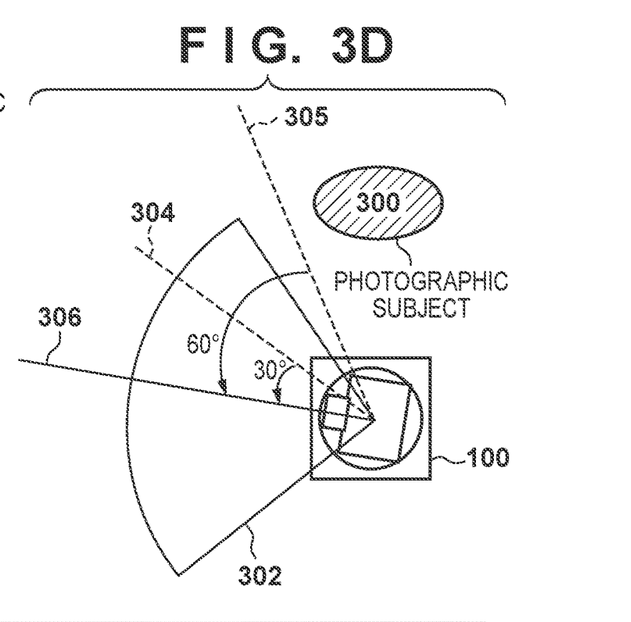

FIG. 3D illustrates a state in which the image capture apparatus 100 has stopped after changing the pan angle by 60° in the counterclockwise direction from the state in FIG. 3C. An angle-of-view center 306 of the image capture apparatus 100 in this state is located at a position that is 60° in the counterclockwise direction from the angle-of-view center 305 at the position in FIG. 3C, and is located at a position that is 30° in the counterclockwise direction from the angle-of-view center 304 at the position in FIG. 3B.

In this example, since a case in which the pan position of the image capture apparatus 100 stopped after moving forward by an amount corresponding to one second from the position where the user intended to shoot an image has been described, the circle sector 302 does not contain the photographic subject 300 at the position in FIG. 3D. However, practically, a situation can be also considered in which, in consideration of the panning operation of the image capture apparatus 100, the user provides an image shooting instruction prior to the position where the user intends to shoot an image, and thus the pan position stops before reaching the intended position. If the pan position of the image capture apparatus 100 stops about one second before the intended position is reached in such a situation, it would be possible to fit the photographic subject 300 into the angle of view at the position in FIG. 3D.

That is, depending on the timing when the user produces the voice that is an image shooting instruction, there are cases in which the lens barrel 101 stops at a position that is beyond or in front of the position of the lens barrel 101 at which the user intended to shoot an image. In such cases, a situation in which the photographic subject 300 cannot be fitted into the angle of view of the image capture apparatus 100 may occur, depending upon the displacement amount of the lens barrel 101 from the target stopping position. Thus, in the present embodiment, the orientation of the lens barrel 101 is shifted by a predetermined angle (moved by a predetermined amount) in the positive and negative directions (in the counterclockwise and clockwise directions) in the driving direction of the lens barrel 101 from the stopping position of the lens barrel 101, and the lens barrel 101 is made to shoot an image at each position. Accordingly, the photographic subject of interest of the user can be fitted into the image shooting angle of view.

In the present embodiment, an example in which the change (shift) of pan angle in the counterclockwise and clockwise directions is set to a fixed value of 30° is described. However, the change of pan angle may be determined in accordance with the pan angle changing velocity (deg/s), the zoom magnification, or other conditions when a voice command is received. This is because, if the pan angle changing velocity when a voice command is received is high, the displacement amount when the lens barrel 101 advances too far or stops in front of the target position due to the deviation of the voice command timing increases. In such a case, it is ensured that the target photographic subject can be fitted into the angle of view by also increasing the amount by which the orientation of the lens barrel 101 is shifted. Similarly, if the zoom magnification when a voice command is received is high, the angle of view would be narrow, and thus the photographic subject would readily be excluded from the angle of view in a case in which the stopping position of the lens barrel 101 shifts. Accordingly, in such a case as well, it is ensured that the target photographic subject can be fitted into the angle of view by increasing the amount by which the orientation of the lens barrel 101 is shifted.

Figure 4:
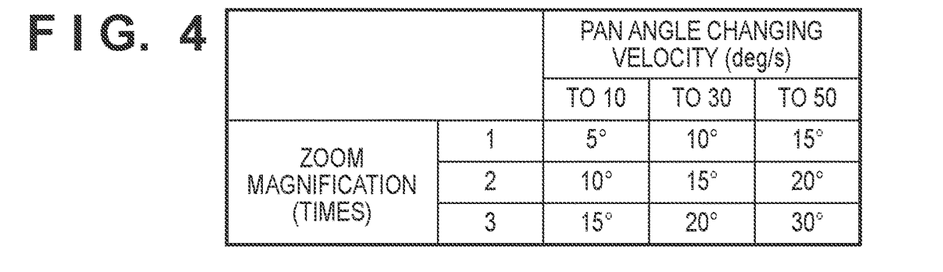
FIG. 4 is a diagram showing a lookup table for determining a pan angle changing amount.

As one example, a lookup table of the pan angle changing amount (angle by which the lens barrel 101 is shifted), which is to be determined in accordance with the pan angle changing velocity and the zoom magnification when a voice command is received, is shown in FIG. 4. In this example, so that the photographic subject of interest can be fitted into the frame with higher accuracy, the pan angle changing amount is set greater for higher pan angle changing velocities and higher zoom magnifications when a voice command is received.

In addition, a configuration may be adopted such that, when a voice command is received, the changing of the pan angle and the shooting of still images are performed after the zoom is reset to the wide end (wide angle end) or set to a specific zoom magnification.

Figure 5:
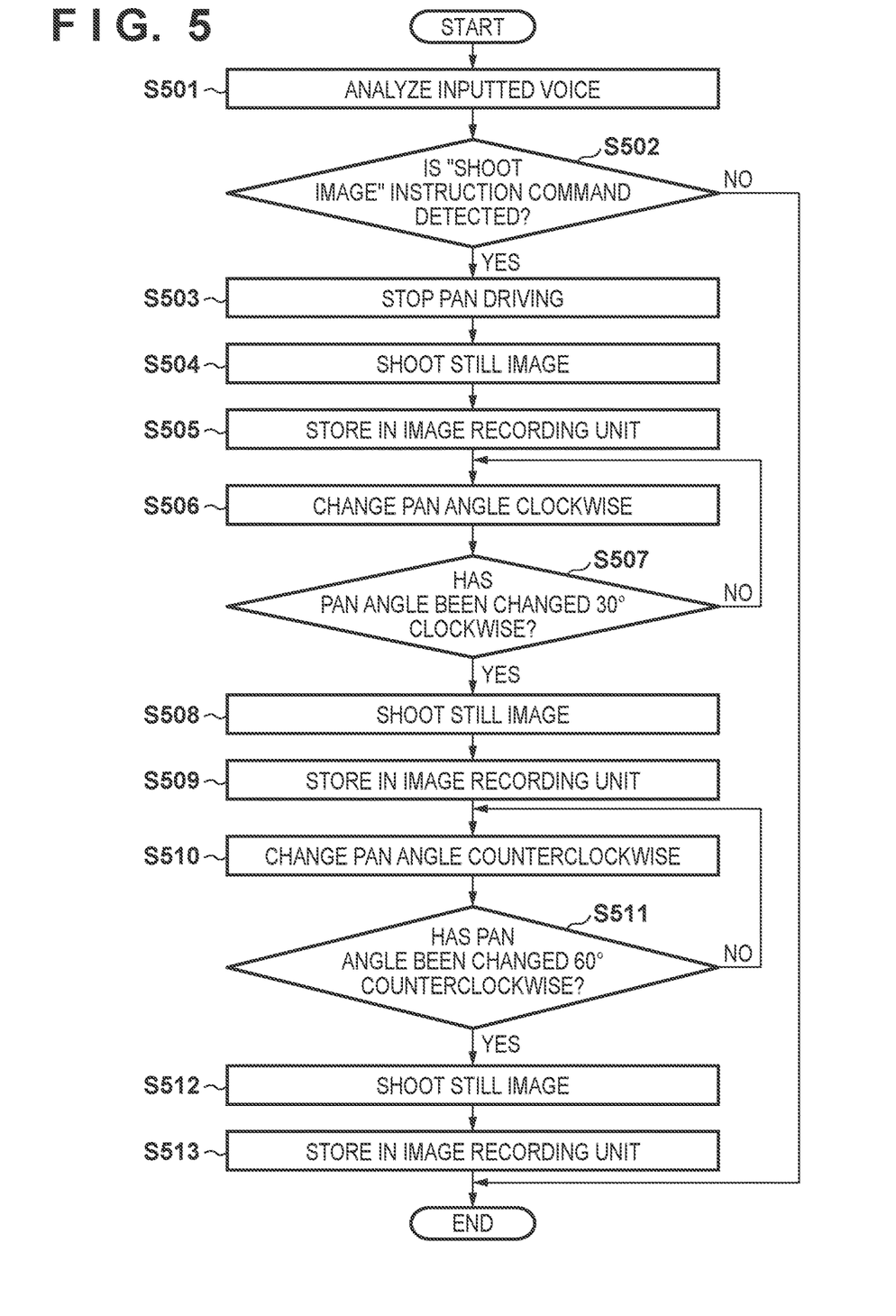
FIG. 5 is a flowchart describing image shooting processing based on a voice command in the first embodiment.

FIG. 5 is a flowchart describing image shooting processing based on a voice command in the first embodiment. Processing for controlling the changing of the pan angle and the shooting of still images performed by the image capture apparatus 100 when a voice command is input will be described in the following with reference to FIG. 5.

In step S501, when voice is input to the image capture apparatus 100, the control unit 207 causes the voice analysis unit 213 to analyze the voice data that is input.

In step S502, the control unit 207 determines whether or not a command that is an instruction to shoot an image is detected as a result of the analysis in step S501. The control unit 207 advances processing to step S503 if a command that is an instruction to shoot an image is detected, and terminates the processing in this flow if determining that such a command is not detected.

In step S503, the control unit 207 stops pan driving by providing the lens barrel driving unit 206 with a pan-driving stopping instruction.

In step S504, the control unit 207 causes the lens barrel 101 to shoot a still image.

In step S505, the control unit 207 performs image processing on the shot image using the image processing unit 203, and stores the processed image to the image recording unit 204.

In step S506, the control unit 207 changes the pan angle by outputting an instruction to change the pan angle by a predetermined amount in the clockwise direction to the lens barrel driving unit 206.

In step S507, the control unit 207 determines whether or not the pan angle changing amount in the clockwise direction has reached 30°. If determining that the pan angle changing amount has not reached 30°, the control unit 207 returns processing to step S506, and repeats steps S506 and S507 until the pan angle changing amount reaches 30°. The control unit 207 advances processing to step S508 when determining that the pan angle changing amount has reached 30°.

In step S508, the control unit 207 causes the lens barrel 101 to shoot a still image.

In step S509, the control unit 207 stores the shot image to the image recording unit 204.

In step S510, the control unit 207 changes the pan angle by outputting an instruction to change the pan angle by a predetermined amount in the counterclockwise direction to the lens barrel driving unit 206.

In step S511, the control unit 207 determines whether or not the pan angle changing amount in the counterclockwise direction has reached 60°. If determining that the pan angle changing amount has not reached 60°, the control unit 207 returns processing to step S510, and repeats steps S510 and S511 until the pan angle changing amount reaches 60°. The control unit 207 advances processing to step S512 when determining that the pan angle changing amount has reached 60°.

In step S512, the control unit 207 causes the lens barrel 101 to shoot a still image.

In step S513, the control unit 207 stores the shot image to the image recording unit 204.

Note that, while the description in the present embodiment is based on the assumption that the pan angle can be freely changed 360° without limitation, processing can be performed similarly also in a case in which there is a limitation on the pan driving range. Specifically, such a case can be dealt with by additionally checking in steps S507 and S511 whether or not limit positions to which rotation is possible have been reached, and advancing to the still image shooting processing in steps S508 and S512, respectively, also if the limit positions have been reached.

Furthermore, in the present embodiment, a case is described in which images are shot at positions after the pan angle is changed by 30° in the clockwise and counterclockwise directions from the stopping position when a command that is an instruction to shoot an image was detected. Such a configuration is adopted since it is intended that a photographic subject of interest would be contained within this range. In order to shoot an image of a photographic subject of interest, it would also be effective to perform automatic image shooting with the pan driving range for searching for a photographic subject limited within the above-described range of 30° in the clockwise and counterclockwise directions for some time after a command that is an instruction to shoot an image is detected.

As described above, the present embodiment enables an image to be shot with a photographic subject of interest fitted into the frame when a user provides an image shooting instruction via a voice command in an image capture apparatus capable of automatically changing the image shooting direction.

Note that, while the present embodiment describes a case in which pan driving is stopped and image shooting is executed when an image shooting instruction is provided as a voice command, processing can be similarly performed in a case in which a stopping instruction command and an image shooting instruction command are separately provided.

Second Embodiment

Portions of the second embodiment differing from the first embodiment will be described in the following, while configuration-related description will be omitted since the system configuration in the second embodiment is the same as that in the first embodiment.

Figure 6:
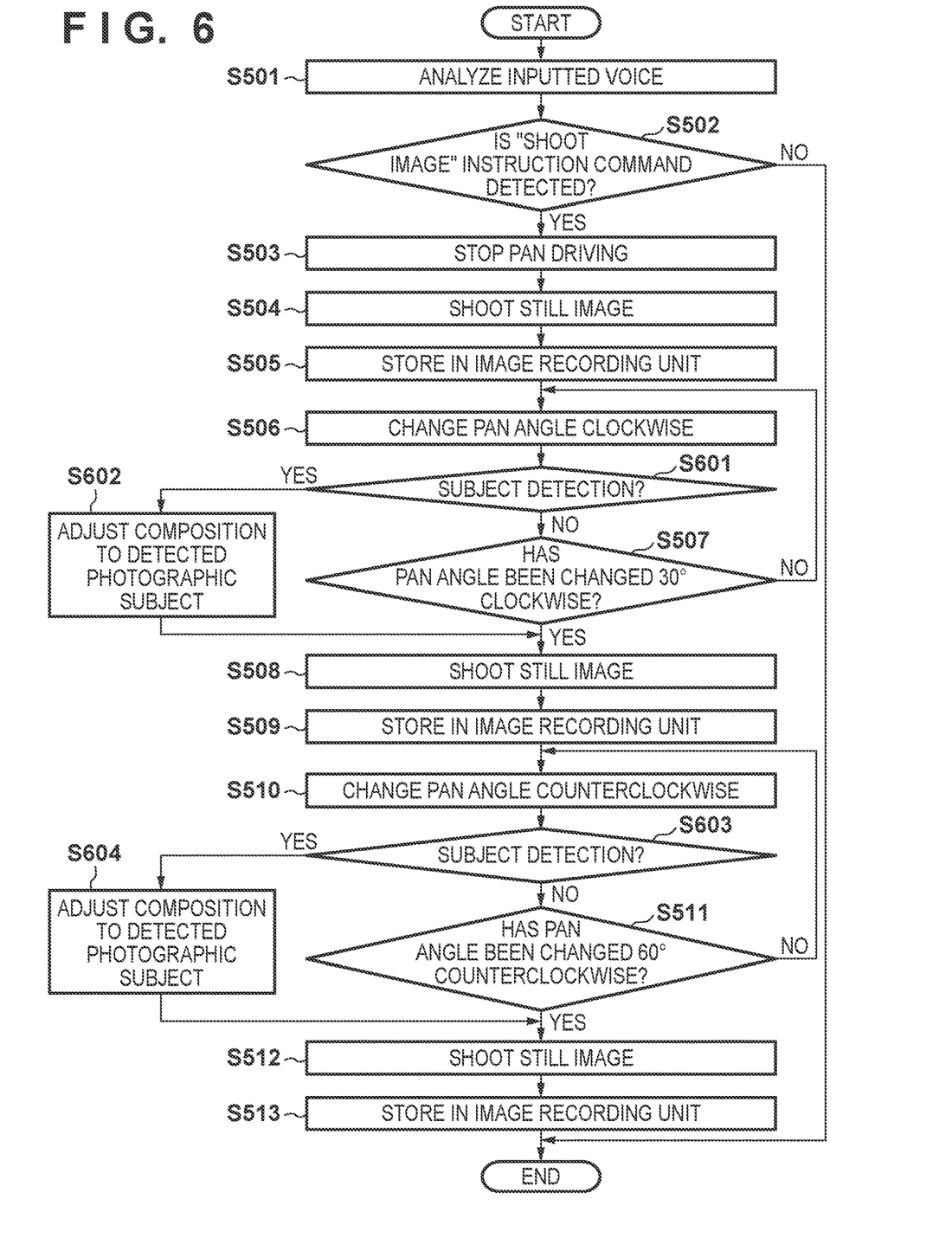
FIG. 6 is a flowchart describing image shooting processing based on a voice command in a second embodiment.

FIG. 6 is a flowchart describing image shooting processing based on a voice command in the second embodiment. Processing for controlling the changing of the pan angle and the shooting of still images performed by the image capture apparatus 100 when a voice command is input will be described in the following with reference to FIG. 6.

The flowchart here is the same as the flowchart in the first embodiment described in FIG. 5, other than the addition of processing for checking the photographic subject detection state (steps S601 and S603) and processing for adjusting the composition to a detected photographic subject (steps S602 and S604). Accordingly, processing other than steps S601, S602, S603, and S604 is provided with the same step number as that in the first embodiment, and description thereof will be omitted.

After the control unit 207 changes the pan angle by outputting an instruction to change the pan angle by a predetermined amount in the clockwise direction to the lens barrel driving unit 206 in step S506, the control unit 207 checks the photographic subject detection state at that position in step S601. The control unit 207 advances processing to step S507 if determining that a photographic subject is not detected, and advances processing to step S602 if determining that a photographic subject was detected. In step S602, the control unit 207 adjusts the composition to the detected photographic subject by instructing the lens barrel driving unit 206 to drive the lens barrel 101. The processing in steps S507 and S508 is as described in the first embodiment.

Similarly, after the control unit 207 changes the pan angle by outputting an instruction to change the pan angle by a predetermined amount in the counterclockwise direction to the lens barrel driving unit 206 in step S510, the control unit 207 checks the photographic subject detection state at that position in step S603. The control unit 207 advances processing to step S511 if determining that a photographic subject is not detected, and advances processing to step S604 if determining that a photographic subject was detected. In step S604, the control unit 207 adjusts the composition to the detected photographic subject by instructing the lens barrel driving unit 206 to drive the lens barrel 101. The processing in steps S511 and S512 is as described in the first embodiment.

Note that, if advancing to the still image shooting processing in steps S508 and S512 from steps S602 and S604, the zoom and the composition (the central composition, the rule of thirds composition, etc.) may be changed since a photographic subject is detected.

As described above, the present embodiment enables an image to be shot with a photographic subject of interest fitted into the frame when a user provides an image shooting instruction via a voice command in an image capture apparatus capable of automatically changing the image shooting direction.

Third Embodiment

Portions of the third embodiment differing from the first embodiment will be described in the following, while configuration-related description will be omitted since the system configuration in the third embodiment is the same as that in the first embodiment.

Figure 7:
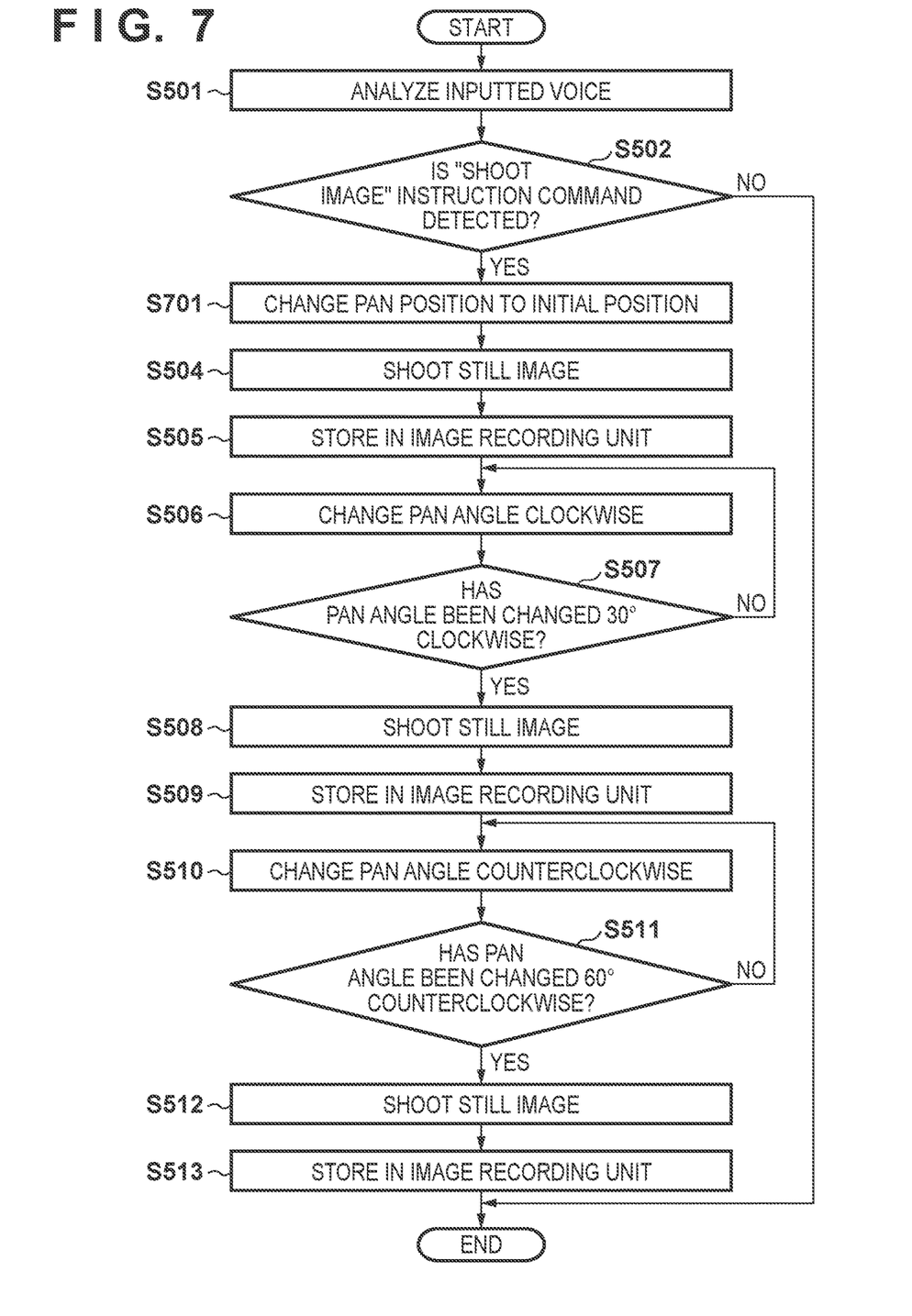
FIG. 7 is a flowchart describing image shooting processing based on a voice command in a third embodiment.

FIG. 7 is a flowchart describing image shooting processing based on a voice command in the third embodiment. Processing for controlling the changing of the pan angle and the shooting of still images performed by the image capture apparatus 100 when a voice command is input will be described in the following with reference to FIG. 7.

Here, the flowchart in the present embodiment is the same as the flowchart in the first embodiment described in FIG. 5, other than the replacement of the pan driving stopping processing (step S503) in the first embodiment with processing for changing the pan position to an initial position (step S701). Accordingly, processing other than step S701 is provided with the same step number as that in the first embodiment, and description thereof will be omitted.

If the control unit 207 determines in step S502 that a command that is an instruction to "shoot an image" is detected, the control unit 207 changes the pan position to an initial position by instructing the lens barrel driving unit 206 to change the pan position to the initial position in step S701. The processing in step S504 and the subsequent steps is as described in the first embodiment.

As described above, the present embodiment enables an image to be shot with a photographic subject of interest fitted into the frame by changing the pan position to a predetermined initial position when a user who already knows the initial position provides a voice command image shooting instruction with the initial position nearly facing the photographic subject of interest in an image capture apparatus capable of automatically changing the image shooting direction.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-030850, filed Feb. 26, 2020 which is hereby incorporated by reference herein in its entirety.

What is claimed is:

1. An image capture apparatus comprising:
   an image capture device configured to capture images;
   a driving device configured to drive to change an orientation of the image capture device;
   an input device configured to receive input of voice; and
   a controller configured to, if the input voice is an instruction to shoot an image, perform control of stopping the change of the orientation of the image capture device and causing the image capture device to capture an image at a stopping orientation, then also of moving the orientation of the image capture device from the stopping orientation by a predetermined amount in positive and negative directions in the drive direction of the driving device and causing the image capture device to capture images at the orientation after being moved in the positive direction and the orientation after being moved in the negative direction.

2. The image capture apparatus according to claim 1, wherein the driving device changes the orientation of the image capture device in the clockwise and counterclockwise directions.

3. The image capture apparatus according to claim 1 further comprising an analysis circuit configured to analyze the input voice.

4. The image capture apparatus according to claim 3, wherein the analysis circuit analyzes the input voice and determines whether or not the voice is an instruction to shoot an image.

5. The image capture apparatus according to claim 1 further comprising:
   a detection circuit configured to detect a photographic subject; and
   an adjustment device configured to adjust an image capture composition of the image capture device,
   wherein, when causing the image capture device to move to the orientation after being moved in the positive direction or to the orientation after being moved in the negative direction, the controller, while causing the image capture device to move, causes the detection circuit to detect a photographic subject, and if a photographic subject is detected, causes the adjustment device to adjust the image capture composition to the detected photographic subject.

6. The image capture apparatus according to claim 5, wherein the detection circuit detects a photographic subject from an image captured by the image capture device.

7. The image capture apparatus according to claim 5, wherein the controller limits a range in which the detection circuit searches for a photographic subject to between the orientation after being moved in the positive direction and the orientation after being moved in the negative direction during a predetermined period after the image capture device stops at the stopping position.

8. The image capture apparatus according to claim 5, wherein the image capture device includes a zoom device configured to change zoom magnification, and the controller causes the zoom device to change the zoom magnification if a photographic subject is detected by the detection circuit.

9. The image capture apparatus according to claim 1, wherein, if the input voice is an instruction to shoot an image, the controller causes the driving device to stop at a predetermined initial orientation and causes the image capture device to capture an image at the initial orientation.

10. A method for controlling an image capture apparatus that comprises an image capture device configured to capture images, the method comprising:

driving to change an orientation of the image capture device;

receiving input of voice; and if the input voice is an instruction to shoot an image, performing control of stopping the change of the orientation of the image capture device and causing the image capture device to capture an image at a stopping orientation, then also of moving the orientation of the image capture device from the stopping orientation by a predetermined amount in positive and negative directions in a drive direction in the driving and causing the image capture device to capture images at the orientation after being moved in the positive direction and the orientation after being moved in the negative direction.

11. A non-transitory computer-readable storage medium storing thereon a program for causing a computer to execute a control method for an image capture apparatus that comprises an image capture device configured to capture images, the method comprising:

driving to change an orientation of the image capture device;

receiving input of voice; and if the input voice is an instruction to shoot an image, performing control of stopping the change of the orientation of the image capture device and causing the image capture device to capture an image at a stopping orientation, then also of moving the orientation of the image capture device from the stopping orientation by a predetermined amount in positive and negative directions in a drive direction in the driving and causing the image capture device to capture images at the orientation after being moved in the positive direction and the orientation after being moved in the negative direction.

* * * * *